United States Patent
Preisser (10) Patent No.: US 11,530,033 B2
(45) Date of Patent: Dec. 20, 2022

(54) THRUST PRODUCING UNIT WITH A FAIL-SAFE ELECTRICAL DRIVE UNIT

(71) Applicant: AIRBUS URBAN MOBILITY GMBH, Munich (DE)

(72) Inventor: Gero Preisser, Etting (DE)

(73) Assignee: Airbus Urban Mobility GmbH, Munich (DE)

( * ) Notice: Subject to any disclaimer, the term of this patent is extended or adjusted under 35 U.S.C. 154(b) by 356 days.

(21) Appl. No.: 16/850,774

(22) Filed: Apr. 16, 2020

(65) Prior Publication Data
US 2020/0407052 A1 Dec. 31, 2020

(30) Foreign Application Priority Data

Jun. 26, 2019 (EP) ..................................... 19400014

(51) Int. Cl.
*B64C 27/12* (2006.01)
*B64D 27/24* (2006.01)
*B64C 27/20* (2006.01)
*B64C 39/02* (2006.01)

(52) U.S. Cl.
CPC .............. *B64C 27/12* (2013.01); *B64C 27/20* (2013.01); *B64C 39/024* (2013.01); *B64D 27/24* (2013.01)

(58) Field of Classification Search
CPC ....... B64C 27/12; B64C 27/006; B64D 27/24; B64D 35/08
USPC .......................................................... 244/23
See application file for complete search history.

(56) References Cited

U.S. PATENT DOCUMENTS

| 2017/0089438 | A1 | 3/2017 | Kolokythas |
| 2017/0217600 | A1 | 8/2017 | Regev |
| 2020/0052541 | A1 | 2/2020 | Wollenberg |
| 2020/0361622 | A1* | 11/2020 | Groninga ................ B64C 27/14 |

FOREIGN PATENT DOCUMENTS

| CA | 2230270 A1 | 10/1999 | |
| DE | 102016220234 A1 | 4/2018 | |
| FR | 2869018 A1 | 10/2005 | |
| WO | WO 8806689 A1 * | 2/1988 | ............. B64D 35/08 |
| WO | 2012023066 A1 | 2/2012 | |
| WO | 2017114643 A1 | 7/2017 | |
| WO | 201877773 A1 | 5/2018 | |

OTHER PUBLICATIONS

European Search Report for European Application No. EP 19400014. 7, Completed by the European Patent Office, dated Jan. 9, 2020, 8 pages.
Indian Examination Report dated May 23, 2021, Application No. 202044052308, 5 Pages.

* cited by examiner

*Primary Examiner* — Brady W Frazier
*Assistant Examiner* — Shanna Danielle Glover
(74) *Attorney, Agent, or Firm* — Brooks Kushman P.C.

(57) ABSTRACT

A thrust producing unit with a fail-safe electrical drive unit that drives a rotor of a rotary-wing aircraft. Fail-safe electrical drive unit may include input shafts, fixedly attached belt pulleys that are fixedly attached to the respective input shafts, output shaft that is coupled to rotor, freewheeling belt pulleys that are mounted to output shaft by means of respective freewheels such that output shaft rotates freely when output shaft rotates faster than one of the freewheeling belt pulleys belts that connect fixedly attached belt pulleys with the respective freewheeling belt pulleys, and electric motors that are coupled with the respective input shafts.

20 Claims, 5 Drawing Sheets

THRUST PRODUCING UNIT WITH A FAIL-SAFE ELECTRICAL DRIVE UNIT

CROSS-REFERENCE TO RELATED APPLICATIONS

This application claims priority to European patent application No. EP 19400014.7 filed on Jun. 26, 2019, the disclosure of which is incorporated in its entirety by reference herein.

BACKGROUND OF THE INVENTION

(1) Field of the Invention

The present embodiments relate to a thrust producing unit, and, more particularly, to a thrust producing unit with a fail-safe electrical drive unit that drives a rotor of a rotary-wing aircraft.

(2) Description of Related Art

Safety is absolutely paramount in air transportation. In fact, air transportation is a field that must typically take into account strict applicable authority regulations, certification requirements, and safety demands independent of a selected air transportation vehicle, such as e.g. helicopters, airplanes, hybrid aircrafts, rockets and so on. Such authority regulations, certification requirements, and safety demands are e.g. specified by the US-American Federal Aviation Regulations (FAR) from the US-American Federal Aviation Administration (FAA), the European Certification Specifications (CS) from the European Aviation Safety Agency (EASA) and/or other aviation authority ruling.

Fixed-wing aircrafts and rotary-wing aircrafts address these safety regulations in several different ways. The most common approach for fixed-wing aircrafts involves the use of overpowered jet engines so that the fixed-wing aircraft continues to be operational with the remaining operative jet engines when one jet engine fails.

In contrast thereto, most rotary-wing aircrafts rely on the auto-rotation capability that most rotors provide and the use of two or more engines that are connected to a same rotor, whereby the rotor remains operational when one of the engines fails.

Recently, urban air mobility (UAM) is emerging as a new market with new safety challenges. In particular, most current solutions for urban air mobility (UAM) involve vertical take-off and landing (VTOL) aircrafts with one or more thrust producing units that have an electrical drive and are usually equipped with fixed pitch propellers which do not have the auto-rotation capability of other rotary-wing aircrafts. Thus, the aviation manufacturers that produce VTOL aircrafts for the UAM market have to imagine new solutions to provide an extra layer of safety.

Document WO 2018/77773 A1 relates to a particularly redundant electrical machine for driving a means of propulsion with increased reliability. The machine comprises a plurality of independent partial rotors which are respectively coupled to a common shaft by means of freewheel devices in order to drive said shaft and the means of propulsion therewith in a working direction of rotation. The machine also comprises a plurality of independent stator winding systems, a stator winding system and a partial rotor being respectively associated with each other and arranged in such a way that they can electromagnetically interact with each other. The stator winding systems are successively arranged in the axial direction. Similarly, the partial rotors are successively arranged in the axial direction.

However, the redundant electrical machine involves a geared solution with two or more motors. The geared solution is very heavy, not flexible in view of revolutions-per-minute (RPM), and not lightning strike safe. Furthermore, the geared solution is not flexible in view of an RPM adaption. Moreover, because of the geared solution, oil lubrication and a chip detector are needed, and one mechanical error can damage the whole gearbox.

Document DE 10 2016 220 234 A1 relates to a release coupling device for troubleshooting an electrical machine, comprising a coupling element for coupling at least two rotors having a shaft via a connection and a decoupling element for decoupling at least one rotor of the two rotors of the shaft by separating the compound, if an error occurs, wherein the at least one rotor of the two rotors is associated with the error.

However, the release coupling device involves a clutch with hirth-teething that separates the at least two rotors in case one motor fails. Therefore, the release coupling device requires the use of a separate release element.

Document US 2017/0217600 A1 describes a propulsion system assembly including a driveshaft and a plurality of electric motor modules. The driveshaft is rotatably mounted to a casing about a drive axis, the driveshaft including a first shaft end and an opposite facing second shaft end. The plurality of electric motor modules is in axially stacked relationship with one another with respect to the drive axis to define an electric motor module stack, each electric motor module being configured for transmitting a torque to the driveshaft when coupled thereto independently of at least one other electric motor module. Each electric motor module includes a controllable clutch arrangement for selectively coupling and decoupling the respective electric motor module with respect to the driveshaft to respectively enable and disable transmission of torque between the respective electric motor module and the driveshaft.

However, the propulsion system assembly involves having a clutch arrangement that decouples the rotor assembly from the driveshaft when electrical current to the clutch arrangement is stopped, leading to a very heavy and complicated system.

Moreover, all these solutions have in common that the propellers are directly mounted on the motor shaft of the respective electric motors. Such an electrical propulsion system in which the propellers are directly mounted on the motor shaft of the respective electric motors is sometimes also referred to as a direct drive system. As a result, the direct drive system has to handle all static and dynamic loads from the propellers, which bears a high risk of a total loss of the drive unit. Furthermore, direct drive systems are usually not lightning strike safe.

Document WO 2012/023066 A1 describes a propulsion and motion-transmission assembly, in particular for a rotary-wing aircraft, the assembly comprising: a first motor-reducer assembly; and a second motor-reducer assembly, wherein the first and second motor-reducer assemblies are arranged for driving in rotation at least one rotor of a rotary-wing aircraft; and wherein each of said first and second motor-reducer assemblies comprises: a mechanical differential including a first input shaft, a second input shaft and an output shaft; and a first electric motor and a second electric motor connected, respectively, to said first and second input shafts, the output shaft of each motor-reducer assembly being arranged for connection in rotation to a rotor of a rotary-wing aircraft.

However, the described propulsion and motion-transmission assembly has a gear transmission installed between the two motors. Similar to the geared solution of Document WO 2018/77773 A1, the described propulsion and motion-transmission assembly is very heavy, not flexible in view of revolutions-per-minute (RPM), and not lightning strike safe. Moreover, because of the geared solution, oil lubrication and a chip detector are needed, and one mechanical error can damage the whole gearbox.

In summary, many state-of-the-art electrical drive units involve a direct drive system or a belt drive system combined with a gear transmission or a clutch arrangement. The direct drive system is not lightning strike safe and the motors have to handle all dynamic and static loads. The belt drive system often requires a gear transmission, which is very heavy, not flexible in RPM, not lightning strike safe, and requires oil lubrication and a chip detector.

BRIEF SUMMARY OF THE INVENTION

It is, therefore, an objective to provide a new thrust producing unit that is suitable to overcome the above-described drawbacks.

The new thrust producing unit should further provide a high safety level, for example with a redundant motor solution for the propeller such that a loss of one motor is not catastrophic (i.e., the loss of one motor should not impact the propeller drive), a lower voltage level than existing solutions, and lightning strike safety.

Moreover, the new thrust producing unit should be light weight, minimize noise emission and service requirements, provide for easy and flexible mounting, flexible power adaption, flexible RPM adaption, and flexible motor configuration.

The objective is solved by a thrust producing unit comprising the features of claim 1. More specifically, a thrust producing unit may comprise a rotor and a fail-safe electrical drive unit. The fail-safe electrical drive unit may comprise first and second input shafts, first and second fixedly attached belt pulleys that are fixedly attached to the respective first and second input shafts, an output shaft that is coupled to the rotor, first and second freewheeling belt pulleys, first and second belts, and first and second electric motors.

The first freewheeling belt pulley is mounted to the output shaft by means of a first freewheel such that the output shaft rotates freely when the output shaft rotates faster than the first freewheeling belt pulley. The second freewheeling belt pulley is mounted to the output shaft by means of a second freewheel such that the output shaft rotates freely when the output shaft rotates faster than the second freewheeling belt pulley.

The first belt connects the first fixedly attached belt pulley with the first freewheeling belt pulley, and the second belt connects the second fixedly attached belt pulley with the second freewheeling belt pulley. The first and second electric motors are coupled with the respective first and second input shafts, wherein the first electric motor drives the output shaft via the first input shaft, the first fixedly attached belt pulley, the first belt, and the first freewheeling belt pulley, and the second electric motor drives the output shaft via the second input shaft, the second fixedly attached belt pulley, the second belt, and the second freewheeling belt pulley.

Thus, a freewheel respectively a freewheeling belt pulley is provided on the output shaft for each of the first and second electric motors that transmits its torque to the output shaft. Thereby, the output shaft is not blocked or braked down in case the first or the second motor fails.

Instead of connecting the first and second electric motors directly to the output shaft, the first and second electric motors are connected to the output shaft for transmission of force by means of a respective first and second belt to the freewheeling belt pulley of the output shaft in order to overcome the above-mentioned problems.

In fact, the illustrative thrust producing unit does not require motor lubrication. In addition, no gearbox and thus, no oil pump is needed. In case a gearbox is used, the oil has to be pumped through the gearbox in order to pump the oil to the gears, often against the gravity force caused by flight maneuvers of the aircraft. Omitting gearbox and oil pump leads to weight savings and minimizes service requirements.

Generally free wheeled bearings are not very suitable for high RPM because the centrifugal force produces a force which causes a lifting movement of the spring-loaded clamping bodies. In such an event, the friction between the clamping bodies and the housing surface of the bearing decreases, which causes slippage and thereby heat production. Therefore, low RPM is provided for free bearings, respectively freewheeling belt pulleys.

Chip detection enables the early detection of material breakouts in the transmission respectively in gearboxes. Neither material eruptions nor a wear pattern occurs by using the illustrative thrust producing unit. Thus, chip detection can be omitted leading to a decrease in cost.

Usually, the electrical phenomena and partial discharge effect at high electrical operating voltages becomes more effective and therefore more dangerous with increasing flight altitude. Because two or more separate electric motors are used, the voltage level of the fail-safe electrical drive unit can be reduced significantly to the non-critical range.

Illustratively, the thrust producing unit has no gearbox, no liquid engine cooling, and no additional inverters with liquid cooling leading to significant weight savings compared to conventional drive systems with comparable operational reliability.

By way of example, the rotational speed of the rotor can be adapted by simply replacing the pulleys with pulleys that have a different diameter. In conventional thrust producing units with a gearbox, new gears and possibly new housings may be needed. Moreover, compared to conventional thrust producing units with gearboxes, no elaborate production of parts is required for the belt drive. Some parts can be even produced using a 3D printer.

Illustratively, the belts dampen noises and vibrations in the drive train compared to conventional thrust producing units. If desired, the belts may be selected to have high electrical resistance, so that a static charge of the rotor may be discharged through the belts, while a lightning strike may be discharged through the belts' housings due to the higher electrical resistance of the belts. Thus, the risk of a motor loss caused by lightning strike is reduced drastically.

Furthermore, due to the design, all parts of the belt drive can be exchanged in a short time. The belts do not require service, and they can be easily replaced after they have reached their maximal operating time. In addition, ball bearings and freewheels also have a fixed service life.

According to one aspect, the fail-safe electrical drive unit, further comprises one or more additional input shafts, one or more additional fixedly attached belt pulleys, one or more additional freewheeling belt pulleys, one or more additional freewheels, one or more additional belts, and one or more additional electric motors, wherein each additional electric motor of the one or more additional electric motors is coupled with an associated input shaft of the one or more additional input shafts and drives the output shaft via the associated input shaft, an associated fixedly attached belt pulley of the one or more additional fixedly attached belt pulleys, an associated belt of the one or more additional belts, an associated freewheeling belt pulley of the one or more additional freewheeling belt pulleys, and an associated freewheel of the one or more additional freewheels, wherein the associated fixedly attached belt pulley is fixedly attached to the associated input shaft, wherein the associated freewheeling belt pulley is mounted to the output shaft by means of the associated freewheel such that the output shaft rotates freely when the output shaft rotates faster than the associated freewheeling belt pulley, and wherein the associated belt connects the associated fixedly attached belt pulley with the associated freewheeling belt pulley.

According to one aspect, the first input shaft has a first end and a second end that is opposite the first end, and the fail-safe electrical drive unit further comprises at least first and second tensioners, wherein the first tensioner is attached to the first end of the first input shaft and the second tensioner to the second end of the first input shaft, wherein the first and second tensioners are adapted to adjust a tension of the first belt.

According to one aspect, the fail-safe electrical drive unit further comprises a bearing support plate that receives at least the first electric motor and one end of the output shaft.

According to one aspect, the fail-safe electrical drive unit further comprises an additional bearing support plate that receives at least one other end of the output shaft.

According to one aspect, the fail-safe electrical drive unit further comprises ribs that connect the bearing support plate with the additional bearing support plate for transferring torque generated at least by the first electric motor from the bearing support plate to the additional bearing support plate.

According to one aspect, the additional bearing support plate comprises at least two threaded holes that are located at different distances from the output shaft.

According to one aspect, at least the first belt is a toothed belt.

According to one aspect, the first and second electric motors are arranged at a same distance from the output shaft.

According to one aspect, the first electric motor is arranged at a first distance from the output shaft and the second electric motor is arranged at a second distance from the output shaft that is different than the first distance.

According to one aspect, the second distance is at least two times greater than the first distance.

According to one aspect, the first input shaft, the second input shaft, and the output shaft are arranged parallel to each other.

According to one aspect, the thrust producing unit may further comprise a rotor hub that is coupled between the rotor blades and the output shaft.

Furthermore, a rotary-wing aircraft may include the thrust producing unit described above.

According to one aspect, the rotary-wing may include at least one additional thrust producing unit described above.

BRIEF DESCRIPTION OF THE DRAWINGS

Embodiments are outlined by way of example in the following description with reference to the attached drawings. In these attached drawings, identical or identically functioning components and elements are labelled with identical reference numbers and characters and are, consequently, only described once in the following description.

DETAILED DESCRIPTION OF THE INVENTION

Figure 1:
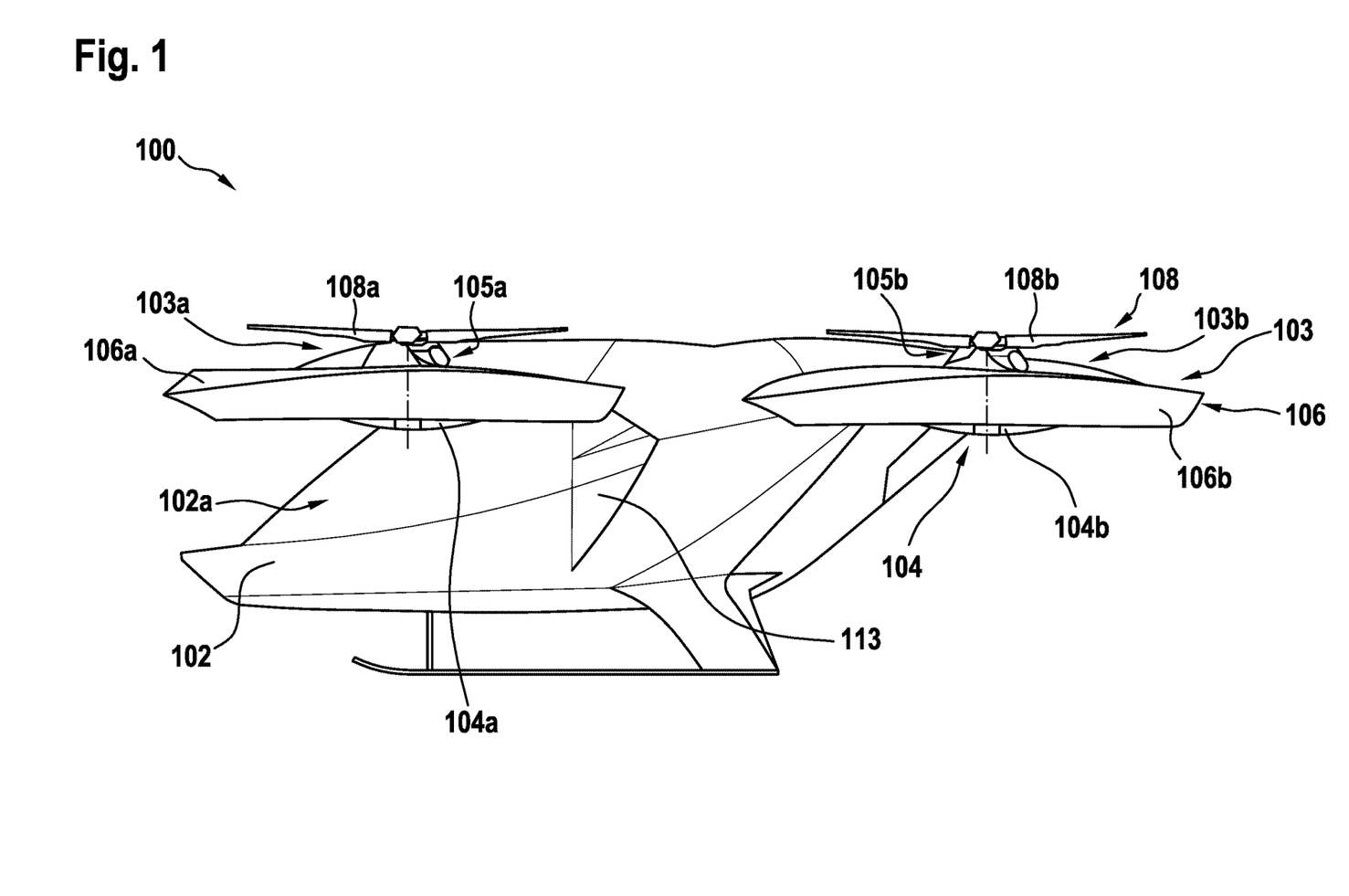
FIG. 1 is a diagram of a side view of an illustrative rotary-wing aircraft with exemplary thrust producing units in accordance with some embodiments.

FIG. 1 shows an aircraft that is embodied by a rotary-wing aircraft 100. It should be noted that rotary-wing aircraft 100 may be any aircraft with rotors. Exemplary embodiments of rotary-wing aircraft 100 may include airplanes, vertical take-off and landing (VTOL) aircrafts, multicopters, helicopters, drones, etc.

Rotary-wing aircraft 100 may have an aircraft airframe 102. The aircraft airframe 102 defines a supporting structure of aircraft 100 that is also referred to hereinafter as the fuselage 102 of the rotary-wing aircraft 100.

The aircraft airframe 102 may be provided with an outer shell 113 that defines an internal volume 102a. According to one aspect, the internal volume 102a is at least adapted for transportation of passengers, so that the rotary-wing aircraft 100 as a whole is adapted for transportation of passengers. The internal volume 102a may be adapted for accommodating operational and electrical equipment, such as e.g. an energy storage system that is required for operation of the rotary-wing aircraft 100.

It should be noted that exemplary configurations of the internal volume 102a that are suitable for transportation of passengers, but also for accommodation of operational and electrical equipment, are readily available to the person skilled in the art and generally implemented to comply with applicable authority regulations and certification requirements regarding passenger transportation. Thus, these configurations of the internal volume 102a are not described in detail for brevity and conciseness.

According to one aspect, the rotary-wing aircraft 100 comprises a predetermined number of thrust producing units 103. If desired, the predetermined number of thrust producing units 103 comprises at least two thrust producing units 103a, 103b. If desired, the predetermined number of thrust producing units 103 may be more than two. For example, rotary-wing aircraft may comprise three, four, or more thrust producing units.

It should be noted that the thrust producing units 103a, 103b are all exemplarily arranged laterally with respect to the fuselage 102. In other words, thrust producing units of the predetermined number of thrust producing units 103 are exemplarily arranged on the left or right side of the fuselage 102 seen in its longitudinal direction. Accordingly, in FIG. 1 only the thrust producing units 103a, 103b are visible, while other thrust producing units of the predetermined number of thrust producing units 103 may be masked by fuselage 102.

However, according to one aspect, two additional thrust producing units may be embodied in an axially symmetrical manner with respect to the thrust producing units 103a, 103b, wherein a longitudinal center axis in the longitudinal direction of fuselage 102 defines the symmetry axis. Accordingly, only the thrust producing units 103a, 103b and their constituent elements are described in more detail hereinafter, while a more detailed description of the additional thrust producing units is omitted for brevity and conciseness.

It should be noted that this exemplary arrangement is only described by way of example and not for limiting the present invention thereto. Instead, other arrangements are also possible and likewise contemplated. For instance, one or more of the predetermined number of thrust producing units 103 may respectively be arranged at a front and/or rear section of the fuselage 102, and so on.

The thrust producing units 103a, 103b are embodied for producing thrust in a predetermined direction in operation such that the rotary-wing aircraft 100 is able to hover in the air as well as to fly in any forward or rearward direction.

Illustratively, the thrust producing units 103a, 103b are structurally connected to a predetermined number of structural supports, which may include at least two structural support members. Illustratively, the predetermined number of structural supports and the predetermined number of thrust producing units 103 form a thrust producing units arrangement.

By way of example, one or more of the thrust producing units 103a, 103b may comprise an associated shrouding in order to improve underlying aerodynamics and to increase operational safety. By way of example, a plurality of shrouding units 106 is shown with two separate shroudings 106a, 106b. Illustratively, the shrouding 106a is associated with the thrust producing unit 103a, and the shrouding 106b with the thrust producing unit 103b.

The shroudings 106a, 106b can be made of a simple sheet metal and/or have a complex geometry. If desired, the shroudings 106a, 106b are connected to the predetermined number of structural supports 104. More specifically, the shrouding 106a is preferably connected to the structural support member 104a, and the shrouding 106b to the structural support member 104b.

According to one aspect, at least one and, preferably, each one of the thrust producing units 103a, 103b is equipped with at least one rotor assembly. By way of example, the thrust producing unit 103a is equipped with a rotor assembly 108a, and the thrust producing unit 103b is equipped with a rotor assembly 108b. The rotor assemblies 108a, 108b illustratively define a plurality of rotor assemblies 108, which is preferably mounted to the plurality of shroudings 106.

The plurality of rotor assemblies 108 may be powered by an associated plurality of engines 105a, 105b, which may be embodied as electrical engines. Illustratively, rotor assembly 106a may be powered by electrical engine 105a and rotor assembly 108b may be powered by electrical engine 105b. However, it should be noted that the engines can respectively be implemented by any suitable engine that is capable of producing torque in operation, such as a turbine, diesel engine, Otto-motor, electrical engine and so on. According to one aspect, fail-safe electrical drive unit 220 of FIG. 2 implements at least one of electrical engines 105a, 105b.

If desired, at least one of the rotor assemblies 108 is accommodated inside of a respectively associated shrouding of the plurality of shroudings 106. Illustratively, the rotor assembly 108a, 108b are accommodated inside of shroudings 106a, 106b, respectively.

In operation of the multirotor aircraft 100, control of thrust generation by means of the thrust producing units 103a, 103b for generating thrust in a predetermined direction may either be achieved by means of an optional pitch variation, by means of RPM variation, or by means of a combination of pitch and RPM variation. If the rotor assemblies 108a, 108b of the plurality of rotor assemblies 108 are not provided with an optional pitch variation, e.g. if respective rotor blades of the rotor assemblies 108a, 108b are implemented as fixed pitch blades, control of the thrust generation by means of pitch variation cannot by performed. In this case, only RPM variation can be used for control of the thrust generation.

According to one aspect, a flexible suspension unit is provided. The flexible suspension unit may be rigidly mounted to the aircraft airframe 102 and mechanically couple the thrust producing units arrangement to the aircraft airframe 102 such that the thrust producing units 103a, 103b are inclinable in relation to the aircraft airframe 102. Inclinations in a predetermined range between approximately +/−30° should at least be enabled.

The flexible suspension may have a neutral interface. The neutral interface may enable the mounting of the thrust producing unit 103a, 103b via the suspension unit to different structures of aircraft airframe 102. If desired, suitable adapters may be used. It should, however, be noted that the thrust producing unit maintains the capability of being inclined relative to aircraft airframe 102.

It should be noted that the term "flexible" refers to the inclination ability of the thrust producing units 103a, 103b in relation to the aircraft airframe 102 and to the ability to mount the same thrust producing unit 103a, 103b to different structures of the aircraft 100 thanks to the neutral interface and the use of suitable adapters. However, the term "flexible" does not refer to the suspension unit as such.

Illustratively, the flexible suspension unit is connected to the structural support members 104a, 104b for mechanically coupling the thrust producing units arrangement to the aircraft airframe 102.

Figure 2:
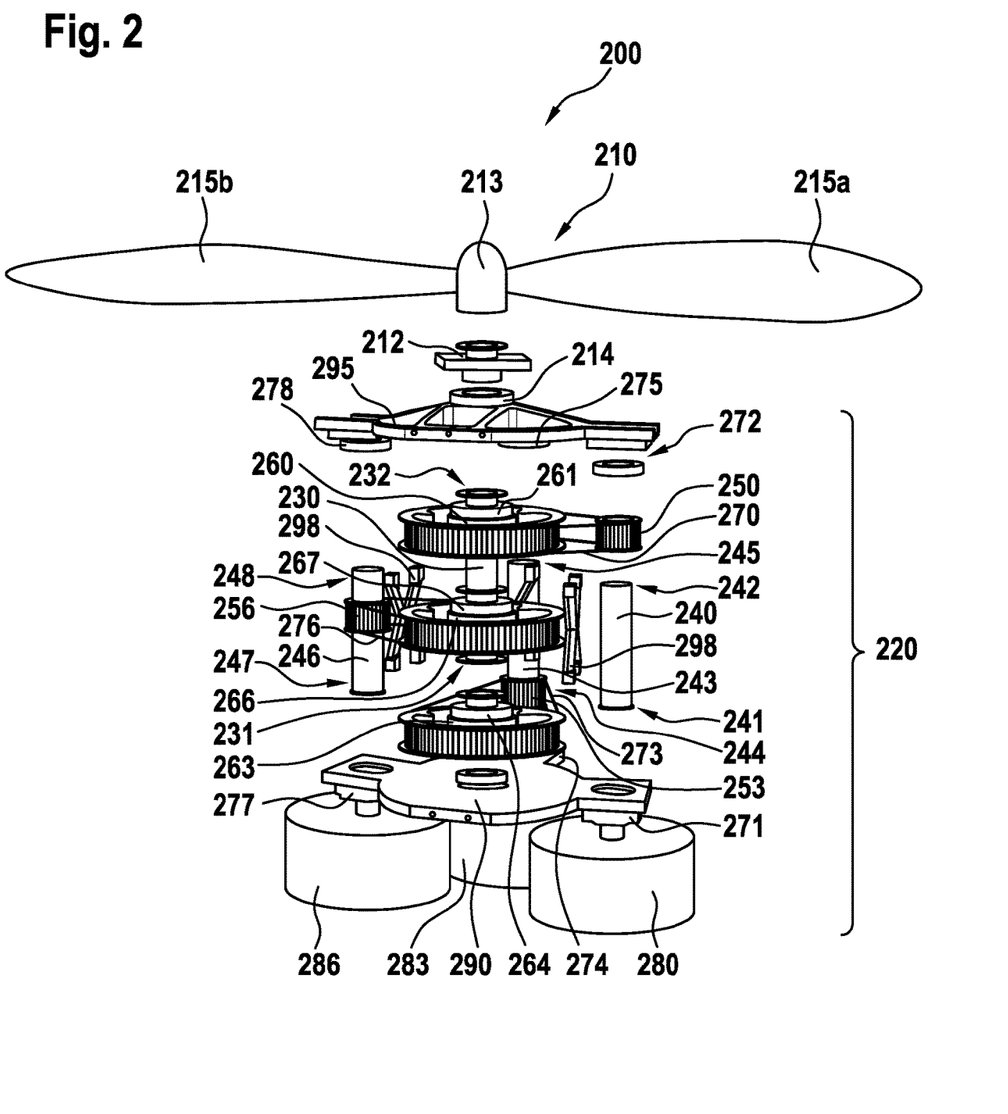
FIG. 2 is a diagram of an exploded view of an illustrative thrust producing unit in accordance with some embodiments.

FIG. 2 is a diagram of an exploded view of an illustrative thrust producing unit (e.g., thrust producing unit 103a or thrust producing unit 103b of FIG. 1) in accordance with some embodiments.

Illustratively, thrust producing unit 200 may include rotor 210 and fail-safe electrical drive unit 220. Rotor 210 may include rotor hub 212, rotor head 213, at least two rotor blades 215a, 215b, and rotor support 214. If desired, rotor support 214 may be part of fail-safe electrical drive unit 220.

As shown, rotor 210 includes at least two rotor blades 215a, 215b. If desired, the number of rotor blades may be more than two. For example, rotor 210 may comprise three, four, or more rotor blades.

Illustratively, rotor 210 may include one rotor assembly, whereby each rotor assembly may include a rotor hub, a rotor head, and at least two rotor blades. However, rotor 210 may include more than one rotor assembly, if desired. As an example, rotor 210 may include two rotor assemblies that define a pair of upper and lower rotor assemblies. As another example, rotor 210 may include three or four rotor assemblies.

As shown, fail-safe electrical drive unit 220 may include output shaft 230, input shafts 240, 243, 246, fixedly attached belt pulleys 250, 253, 256, freewheeling belt pulleys 260, 263, 266, freewheels 261, 264, 267, belts 270, 273, 276, tensioners 271, 272, 274, 275, 277, 278, electric motors 280, 283, 286, bearing support plates 290, 295, and ribs 298.

Illustratively, output shaft 230 may be coupled to rotor 210. For example, output shaft 230 may be coupled to rotor 210 via bearing support plate 295 and rotor support 214. In other words, output shaft 230 may be coupled to rotor blades 215*a*, 215*b* via bearing support plate 295, rotor support 214, rotor hub 212, and rotor head 213.

Fixedly attached belt pulleys 250, 253, 256 may be fixedly attached to the respective input shafts 240, 243, 246. In other words, fixedly attached belt pulleys 250, 253, 256 may rotate with and at the same revolutions per minute (RPM) as the respective input shafts 240, 243, 246 to which they are attached.

Freewheeling belt pulleys 260, 263, 266 may be mounted to the output shaft 230 by means of freewheels 261, 264, 267 such that the output shaft 230 rotates freely when the output shaft 230 rotates faster than a respective freewheeling belt pulley of freewheeling belt pulleys 260, 263, 266.

In other words, a freewheel, which are sometimes also referred to as an overrunning clutch, of freewheels 261, 264, 267, disengages from output shaft 230 when output shaft 230 rotates faster than the freewheel.

Belts 270, 273, 276 may connect the respective fixedly attached belt pulleys 250, 253, 256 with the respective freewheeling belt pulleys 260, 263, 266.

Belts 270, 273, 276 may be any belt that is adapted for transmitting power from the respective fixedly attached belt pulleys 250, 253, 256 to the corresponding respective freewheeling belt pulleys 260, 263, 266. For example, belts 270, 273, 276 may be flat belts, rope drives, round belts, spring belts, V belts, multi-groove belts, ribbed belts, film belts, toothed belts, or any other specialty belts. In some embodiments, at least one belt of belts 270, 273, 276 is a toothed belt, which is sometimes also referred to as a timing belt, notch belt, cog belt, or synchronous belt.

As shown, input shafts 240, 243, 246 and output shaft 230 are arranged parallel to each other. However, input shafts 240, 243, 246 and output shaft 230 may be arranged non-parallel to each other. Arranging input shafts 240, 243, 246 and output shaft 230 parallel or non-parallel to each other may be based on respective belts 270, 273, 276 and/or respective fixedly attached belt pulleys 250, 253, 256 and/or respective freewheeling belt pulleys 260, 263, 266.

Electric motors 280, 283, 286 may be coupled with the respective input shafts 240, 243, 246 and drive output shaft 230 via the respective input shaft 240, 243, 246, the respective fixedly attached belt pulley 250, 253, 256, the respective belt 270, 273, 276, and the respective freewheeling belt pulley 260, 263, 266.

Electric motors 280, 283, 286 may be any type of electric motor that is adapted for driving rotor 210 via output shaft 230. Illustratively, electric motors 280, 283, 286 may be AC type motors or DC type motors, brushed or brushless, single-phase, two-phase, or three-phase, air-cooled or liquid cooled, or any combination thereof.

Illustratively, each input shaft of input shafts 240, 243, 246 may have two ends that are located opposite of each other. As an example, input shaft 240 may have end 241 and end 242 that is opposite end 241. As another example, input shaft 243 may have end 244 and end 245 that is opposite end 244. As yet another example, input shaft 246 may have end 247 and end 248 that is opposite end 247.

If desired, at least two tensioners 271 and 272, 274 and 275, or 277 and 278 may be associated with a respective input shaft 240, 243, 246. For example, tensioner 271, 274, 277 may be attached to the respective end 241, 244, 247 of the respective input shaft 240, 243, 246 and tensioner 272, 275, 278 to the respective end 242, 245, 248 of the respective input shaft 240, 243, 246. Thereby, tensioners 271 and 272, 274 and 275, or 277 and 278 may be adapted to adjust a tension of the respective belt 270, 273, 276.

Illustratively, fail-safe electrical drive unit 220 may include bearing support plate 290. Bearing support plate 290 may receive at least one of electric motors 280, 283, 286 and one end 231 of output shaft 230.

If desired, fail-safe electrical drive unit 220 may include an additional bearing support plate 295. Additional bearing support plate 295 may receive at least one other end 232 of output shaft 230.

By way of example, ribs 298 may connect bearing support plate 290 with additional bearing support plate 295. Ribs 298 may be adapted for transferring torque generated by the at least one of electric motors 280, 283, 286 from bearing support plate 290 to additional bearing support plate 295.

A respective electric motor with a respective input shaft, a respective fixedly attached belt pulley, a respective freewheeling belt pulley, and a respective freewheel may form an electrical drive element. As shown in FIG. 2, fail-safe electrical drive unit 220 may include three electrical drive elements.

The three electrical drive elements may all drive output shaft 230 at a same predetermined speed, if desired. Consider the scenario in which the electrical drive element associated with electric motor 280 of the three electrical drive elements fails. For example, electric motor 280 may fail, input shaft 240 or fixedly attached belt pulley 260 may break, or belt 270 may tear or become loose.

In this scenario, electric motor 280 may fail to drive freewheeling belt pulley 260 at the same predetermined speed as electric motors 283 or 286 drive respective freewheeling belt pulley 263 or 266. Thus, freewheeling belt pulley 260 may disengage from output shaft 230, which may continue to operate at the same predetermined speed thanks to the two still operational electrical drive elements associated with electric motors 283 and 286.

If desired, fail-safe electrical drive unit 220 may include only two electric drive elements. For example, fail-safe electrical drive unit 220 may include first and second input shafts 240, 246, first and second fixedly attached belt pulleys 250, 256 that are fixedly attached to the respective first and second input shafts 240, 246, and an output shaft 230 that is coupled to the rotor 210, first and second freewheeling belt pulleys 260, 266, wherein the first freewheeling belt pulley 260 is mounted to the output shaft 230 by means of a first freewheel 261 such that the output shaft 230 rotates freely when the output shaft 230 rotates faster than the first freewheeling belt pulley 260, and wherein the second freewheeling belt pulley 266 is mounted to the output shaft 230 by means of a second freewheel 267 such that the output shaft 230 rotates freely when the output shaft 230 rotates faster than the second freewheeling belt pulley 266.

If desired, fail-safe electrical drive unit 220 may further include first and second belts 270, 276, wherein the first belt 270 connects the first fixedly attached belt pulley 250 with the first freewheeling belt pulley 260, and wherein the second belt 276 connects the second fixedly attached belt pulley 256 with the second freewheeling belt pulley 266, and first and second electric motors 280, 286 that are coupled with the respective first and second input shafts 240, 246, wherein the first electric motor 280 drives the output shaft 230 via the first input shaft 240, the first fixedly attached belt pulley 250, the first belt 270, and the first freewheeling belt pulley 260, and wherein the second electric motor 286 drives the output shaft 230 via the second input shaft 246, the second fixedly attached belt pulley 256, the second belt 276, and the second freewheeling belt pulley 266.

If desired, fail-safe electrical drive unit 220 may include more than two or three electric drive elements. For example, fail-safe electrical drive unit 220 may include one or more additional input shafts, one or more additional fixedly attached belt pulleys, one or more additional freewheeling belt pulleys, one or more additional freewheels, one or more additional belts, and one or more additional electric motors, wherein each additional electric motor of the one or more additional electric motors is coupled with an associated input shaft of the one or more additional input shafts and drives the output shaft via the associated input shaft, an associated fixedly attached belt pulley of the one or more additional fixedly attached belt pulleys, an associated belt of the one or more additional belts, an associated freewheeling belt pulley of the one or more additional freewheeling belt pulleys, and an associated freewheel of the one or more additional freewheels.

Illustratively, the associated fixedly attached belt pulley is fixedly attached to the associated input shaft, wherein the associated freewheeling belt pulley is mounted to the output shaft by means of the associated freewheel such that the output shaft rotates freely when the output shaft rotates faster than the associated freewheeling belt pulley, and wherein the associated belt connects the associated fixedly attached belt pulley with the associated freewheeling belt pulley.

Figure 3:
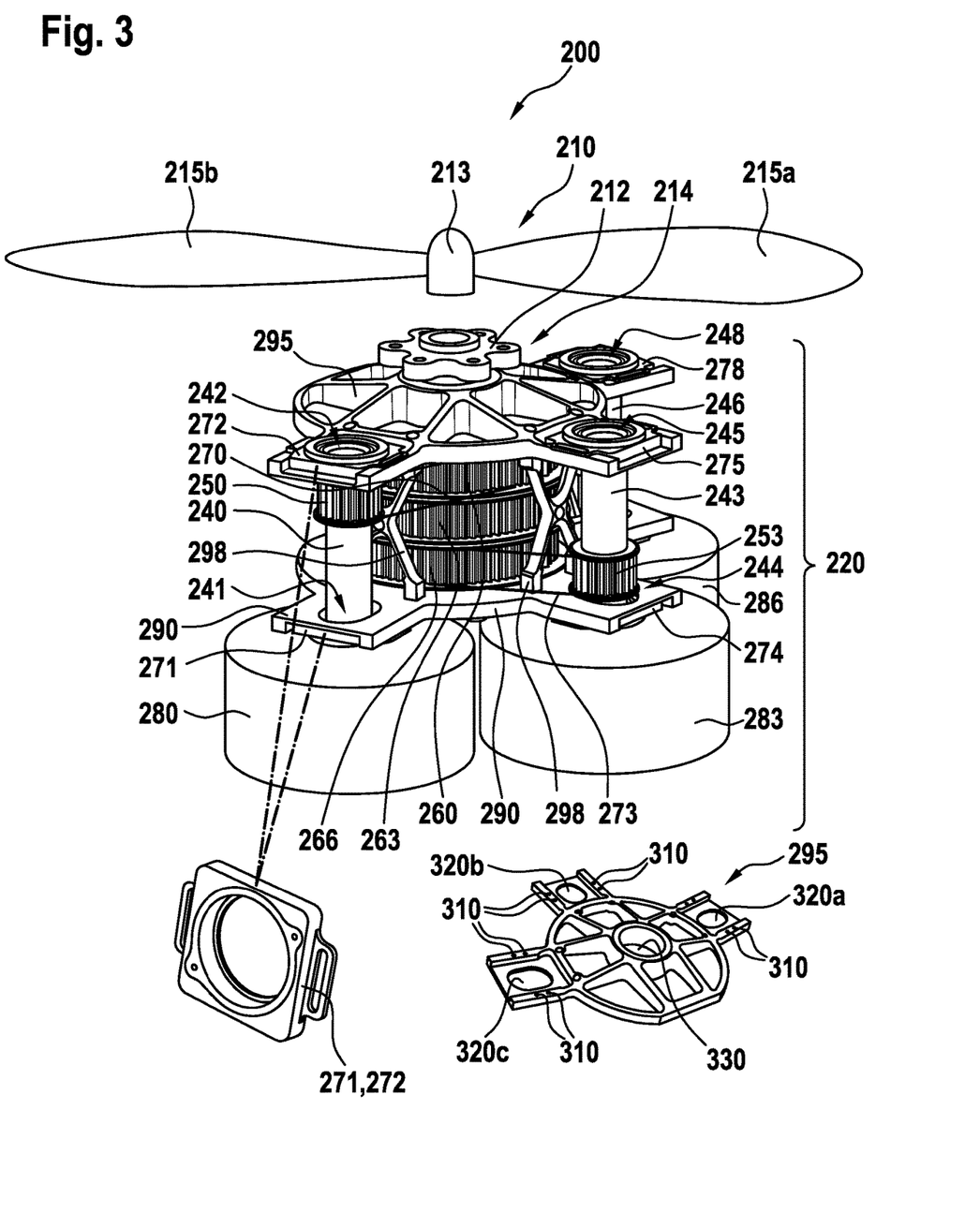
FIG. 3 is a diagram of a compact view of an illustrative thrust producing unit in accordance with some embodiments.

FIG. 3 is a diagram of a compact view of illustrative thrust producing unit 200. As shown, electric motors 280, 283, and 286 are arranged in motor housings for torque compensation. If desired, the motor housings of respective electric motors 280, 283, 286 may be fixedly mounted to bearing support plate 290. The motor driveshaft of electric motors 280, 283, 286 is attached to the respective input shaft 240, 243, 246.

In order to guarantee the best load transmission from fixedly attached belt pulleys 250, 253, 256 to the respective freewheeling belt pulleys 260, 263, 266, each respective belt 270, 273, 276 may be tightened or loosened by means of the respective belt tensioners 271 and 272, 274 and 275, 277 and 278. FIG. 3 shows detailed views of illustrative tensioners 271, 272 and bearing support plate 295.

Bearing support plate 295 may include hole 330 for receiving one end of the output shaft (e.g., end 232 of output shaft 230 of FIG. 2). If desired, bearing support plate 295 may have long holes 320a, 320b, 320c for receiving one end 242, 245, 248 of respective input shafts 240, 243, 246.

Illustratively, at least two threaded holes 310 may be associated with each long hole 320a, 320b, 320c. If desired, the at least two threaded holes 310 may be located at different distances from output shaft 230.

As shown in FIG. 3, two pairs of threaded holes 310 is associated with a predetermined distance from hole 330 and placed on the sides of long holes 320a, 320b, 320c. However, bearing support plate 295 may have more than two pairs of threaded holes 310 associated with a predetermined distance from hole 330. If desired, bearing support plate 295 may have threaded holes 310 aligned with hole 330 and respective long holes 320a, 320b, 320c. As an example, bearing support plate 295 may have threaded holes 310 between hole 330 and respective long holes 320a, 320b, 320c. As another example, bearing support plate 295 may have threaded holes 310 on the opposite side of respective long holes 320a, 320b, 320c as in the previous example.

Tensioners 272, 275, 278 may be attached to bearing support plates 295 at the corresponding threaded holes 310. Thereby, tensioners 272, 275, 278 may be moved to a respective preferred position by moving respective input shafts 240, 243, 246 through respective long holes 320a, 320b, 320c before the respective tensioners 272, 275, 278 are tightened respectively fixed at this position using one of the at least two threaded holes 310 for each tensioner 272, 275, 278.

If desired, tensioners 272, 275, 278 or tensioners 271, 274, 277 may be attached to a structural part of an aircraft to which thrust producing unit 200 is attached.

Figure 4A:
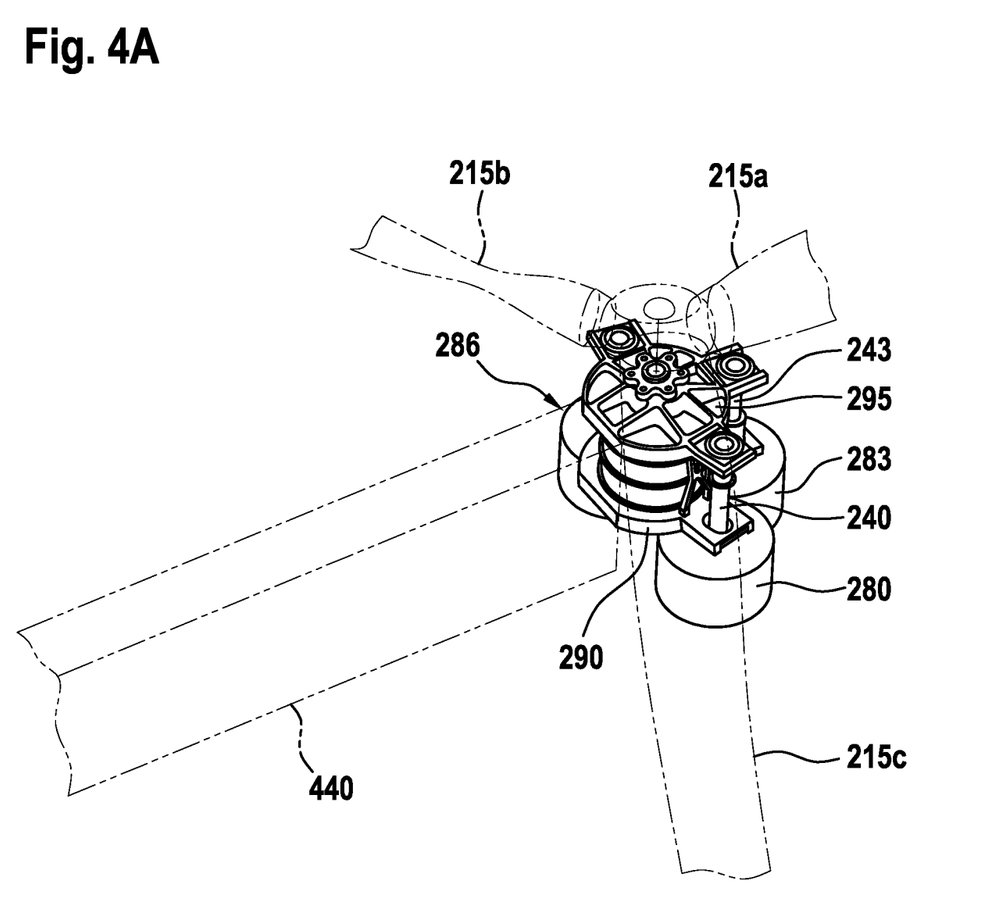
FIG. 4A is a diagram of an illustrative thrust producing unit having at least two electric motors arranged at an equal distance from the output shaft in accordance with some embodiments.

If desired, bearing support plate 290 and/or bearing support plate 295 may be attached a structural part of an aircraft to which thrust producing unit 200 is attached. FIG. 4A is a diagram of an illustrative thrust producing unit that has at least one bearing support plate 290 or 295 attached to an aircraft structure 440.

Consider the scenario in which only one of bearing support plates 290, 295 is attached to aircraft structure 440. In this scenario, the thrust producing unit may include ribs that transfer the torque generated by electric motors 280, 283, 286 to the other bearing support plate of bearing support plates 290, 295. In case both bearing support plates 290 and 295 are attached to aircraft structure 440 the ribs may be omitted.

If desired, the thrust producing unit may have at least two electric motors 280, 283 arranged at a same distance from the output shaft. For example, thrust producing unit 200 of FIG. 2 may have three electric motors 280, 283, 286 arranged at an equal distance from output shaft 230.

Figure 4B:
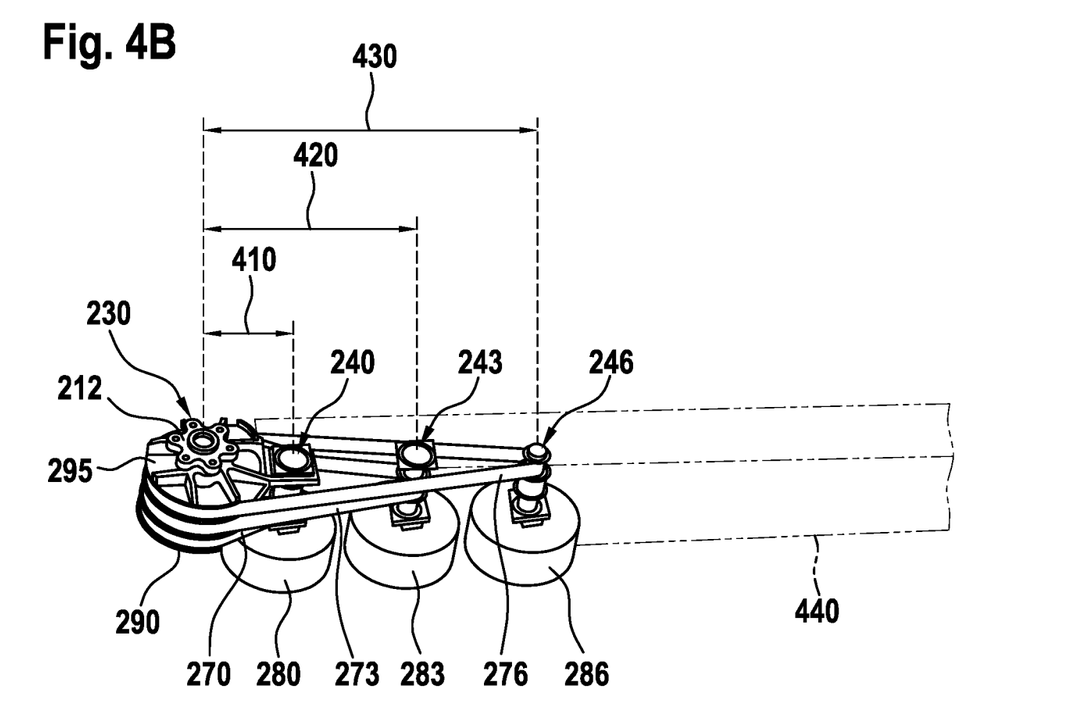
FIG. 4B is a diagram of an illustrative thrust producing unit with three aligned electric motors in accordance with some embodiments.

However, electric motors 280, 283, 286 may be arranged at different distances from output shaft 230. FIG. 4B is a diagram of an illustrative thrust producing unit with three aligned electric motors 280, 283, 286. Aligning electric motors 280, 283, 286, especially in forward flight direction, may reduce the aerodynamical drag caused by the respective electric motors 280, 283, 286. If desired, electric motors 280, 283, 286 may be aligned with output shaft 230.

Illustratively, electric motor 280 is arranged at a first distance 410 from output shaft 230 and electric motors 283, 286 are arranged at a second distance 420, 430 from output shaft 230, respectively. The second distance may be selected to be different than the first distance. For example, the second distance 420, 430 may be at least two times greater than the first distance 410.

It should be noted that modifications to the above described embodiments are within the common knowledge of the person skilled in the art and, thus, also considered as being part of the present invention.

For instance, electric motors 280, 283, 286 of FIG. 3 drive the upper, lower, and middle freewheel belt pulley 260, 263, 266, respectively. However, any other appropriate combination of electric motors 280, 283, 286 driving a particular freewheel belt pulley 260, 263, 266 may be selected instead. For example, electric motors 280, 283, 286 may drive lower, middle, and upper freewheel belt pulley 263, 266, 260, respectively.

Furthermore, fail-safe electrical drive unit 220 of FIG. 3 may be modified and/or include different components as shown without changing its functionality. As an example, by changing the shape of bearing support plates 290, 295, electric motors 280, 283, 286 may be placed closer to respective fixedly attached belt pulleys 250, 253, 256, thereby reducing the length of respective input shafts 240, 243, 246.

REFERENCE LIST 100 aircraft
102 aircraft airframe, fuselage 102a aircraft airframe internal volume
103 thrust producing units
103a, 103b thrust producing unit
104 thrust producing units support structure
104a, 104b thrust producing units support structure member
105a, 105b fail-safe electrical drive unit
106 shrouding units
106a, 106b shrouding
108 rotor assemblies
108a, 108b rotor assembly
113 outer shell
200 thrust producing unit
210 rotor
212 rotor hub
213 rotor head
214 rotor support
215a, 215b rotor blade
220 fail-safe electrical drive unit
230 output shaft
231, 232 end of output shaft
240, 243, 246 input shaft
241, 242, 244, 245, 247, 248 end of input shaft
250, 253, 256 fixedly attached belt pulley
260, 263, 266 freewheeling belt pulley
261, 264, 267 freewheel
270, 273, 276 belt
271, 272, 274, 275, 277, 278 tensioners
280, 283, 286 electric motor
290, 295 bearing support plate
298 ribs
310 threaded hole
320a, 320b, 320c long hole
330 hole
410, 420, 430 distance
440 aircraft structure

What is claimed is:

1. A thrust producing unit, comprising:
a rotor; and
a fail-safe electrical drive unit, comprising:
first and second input shafts, wherein the first input shaft has a first end and a second end that is opposite the first end;
first and second fixedly attached belt pulleys that are fixedly attached to the respective first and second input shafts;
an output shaft that is coupled to the rotor;
first and second freewheeling belt pulleys, wherein the first freewheeling belt pulley is mounted to the output shaft by means of a first freewheel such that the output shaft rotates freely when the output shaft rotates faster than the first freewheeling belt pulley, and wherein the second freewheeling belt pulley is mounted to the output shaft by means of a second freewheel such that the output shaft rotates freely when the output shaft rotates faster than the second freewheeling belt pulley;
first and second belts, wherein the first belt connects the first fixedly attached belt pulley with the first freewheeling belt pulley, and wherein the second belt connects the second fixedly attached belt pulley with the second freewheeling belt pulley;
first and second electric motors that are coupled with the respective first and second input shafts, wherein the first electric motor drives the output shaft via the first input shaft, the first fixedly attached belt pulley, the first belt, and the first freewheeling belt pulley, and wherein the second electric motor drives the output shaft via the second input shaft, the second fixedly attached belt pulley, the second belt, and the second freewheeling belt pulley; and
at least first and second tensioners, wherein the first tensioner is attached to the first end of the first input shaft and the second tensioner to the second end of the first input shaft, wherein the first and second tensioners are adapted to adjust a tension of the first belt.

2. The thrust producing unit of claim 1, wherein the fail-safe electrical drive unit, further comprises:
one or more additional input shafts;
one or more additional fixedly attached belt pulleys;
one or more additional freewheeling belt pulleys;
one or more additional freewheels;
one or more additional belts; and
one or more additional electric motors,
wherein each additional electric motor of the one or more additional electric motors is coupled with an associated input shaft of the one or more additional input shafts and drives the output shaft via the associated input shaft, an associated fixedly attached belt pulley of the one or more additional fixedly attached belt pulleys, an associated belt of the one or more additional belts, an associated freewheeling belt pulley of the one or more additional freewheeling belt pulleys, and an associated freewheel of the one or more additional freewheels,
wherein the associated fixedly attached belt pulley is fixedly attached to the associated input shaft, wherein the associated freewheeling belt pulley is mounted to the output shaft by means of the associated freewheel such that the output shaft rotates freely when the output shaft rotates faster than the associated freewheeling belt pulley, and wherein the associated belt connects the associated fixedly attached belt pulley with the associated freewheeling belt pulley.

3. The thrust producing unit of claim 1, wherein the fail-safe electrical drive unit further comprises:
a bearing support plate that receives at least the first electric motor and one end of the output shaft.

4. The thrust producing unit of claim 3, wherein the fail-safe electrical drive unit further comprises:
an additional bearing support plate that receives at least one other end of the output shaft.

5. The thrust producing unit of claim 4, wherein the fail-safe electrical drive unit further comprises:
ribs that connect the bearing support plate with the additional bearing support plate for transferring torque generated at least by the first electric motor from the bearing support plate to the additional bearing support plate.

6. The thrust producing unit of claim 4, wherein the additional bearing support plate comprises:
at least two threaded holes that are located at different distances from the output shaft.

7. The thrust producing unit of claim 1, wherein at least the first belt is a toothed belt.

8. The thrust producing unit of claim 1, wherein the first and second electric motors are arranged at a same distance from the output shaft.

9. The thrust producing unit of claim 1, wherein the first electric motor is arranged at a first distance from the output shaft and the second electric motor is arranged at a second distance from the output shaft that is different than the first distance.

10. The thrust producing unit of claim 9, wherein the second distance is at least two times greater than the first distance.

11. The thrust producing unit of claim 1, wherein the first input shaft, the second input shaft, and the output shaft are arranged parallel to each other.

12. The thrust producing unit of claim 1, further comprising:
a rotor hub that is coupled between the rotor blades and the output shaft.

13. A rotary-wing aircraft comprising the thrust producing unit of claim 1.

14. The rotary-wing aircraft of claim 13, further comprising at least one additional thrust producing unit.

15. The thrust producing unit of claim 1, wherein the first and second freewheeling belt pulleys are each directly mounted to the output shaft via the first and second freewheels, respectively.

16. The thrust producing unit of claim 1, wherein the first freewheeling belt pulley is mounted to the output shaft by the first freewheel for rotation about the output shaft; and
wherein the second freewheeling belt pulley is mounted to the output shaft by the second freewheel for rotation about the output shaft.

17. The thrust producing unit of claim 4, wherein the bearing support plate defines an elongated hole to receive the first end of the first input shaft, wherein a position of the first end of the first input shaft is adjusted within the elongated hole via the first tensioner to adjust the tension on the first belt.

18. A thrust producing unit, comprising:
a rotor; and
a fail-safe electrical drive unit, comprising:
an output shaft coupled to the rotor, the output shaft rotating about an axis of rotation,
a first electric motor drivingly coupled to a first input shaft, the first input shaft having a first end and a second end opposite thereto,
a first fixedly attached belt pulley fixedly attached to the first input shaft,
a first freewheeling belt pulley mounted to the output shaft by a first freewheel such that the output shaft rotates freely when the output shaft rotates faster than the first freewheeling belt pulley, the first freewheeling belt pulley positioned to rotate about the axis of rotation,
a first belt connecting the first fixedly attached belt pulley with the first freewheeling belt pulley,
first and second tensioners, the first tensioner attached to the first end of the first input shaft and the second tensioner attached to the second end of the first input shaft, wherein the first and second tensioners are adapted to move the first input shaft to adjust a tension of the first belt,
a second electric motor drivingly coupled to a second input shaft,
a second fixedly attached belt pulley fixedly attached to the second input shaft,
a second freewheeling belt pulley mounted to the output shaft by a second freewheel such that the output shaft rotates freely when the output shaft rotates faster than the second freewheeling belt pulley, the second freewheeling belt pulley positioned to rotate about the axis of rotation, and
a second belt connecting the second fixedly attached belt pulley with the second freewheeling belt pulley,
wherein the first electric motor drives the output shaft via the first input shaft, the first fixedly attached belt pulley, the first belt, and the first freewheeling belt pulley, and
wherein the second electric motor drives the output shaft via the second input shaft, the second fixedly attached belt pulley, the second belt, and the second freewheeling belt pulley.

19. The thrust producing unit of claim 18 further comprising a bearing support plate defining a hole receiving the output shaft, and an elongated hole receiving the first end of the first input shaft;
wherein the first tensioner is attached to the bearing support plate and fixes the first input shaft at a position within the elongated hole to adjust the tension of the first belt.

20. The thrust producing unit of claim 19 wherein the bearing support plate defines at least two threaded holes adjacent to the elongated hole, the at least two threaded holes located at different distances from the hole receiving the output shaft; and
wherein the first tensioner is attached to the bearing support plate via one of the threaded holes.

* * * * *